Oct. 21, 1947.  E. L. SUTTER  2,429,496
ROTARY CONVEYOR FOR CONDENSERS
Filed July 16, 1943  4 Sheets-Sheet 1

Inventor
Erwin L. Sutter
by Roberts Cushman & Woodberry
Att'ys.

Oct. 21, 1947.  E. L. SUTTER  2,429,496
ROTARY CONVEYOR FOR CONDENSERS
Filed July 16, 1943  4 Sheets-Sheet 2

Inventor
Erwin L. Sutter
by Roberts Cushman & Woodberry
Att'ys.

Oct. 21, 1947. E. L. SUTTER 2,429,496
ROTARY CONVEYOR FOR CONDENSERS
Filed July 16, 1943 4 Sheets-Sheet 3

Inventor
Erwin L. Sutter
by Roberts Cushman & Woodberry
att'ys.

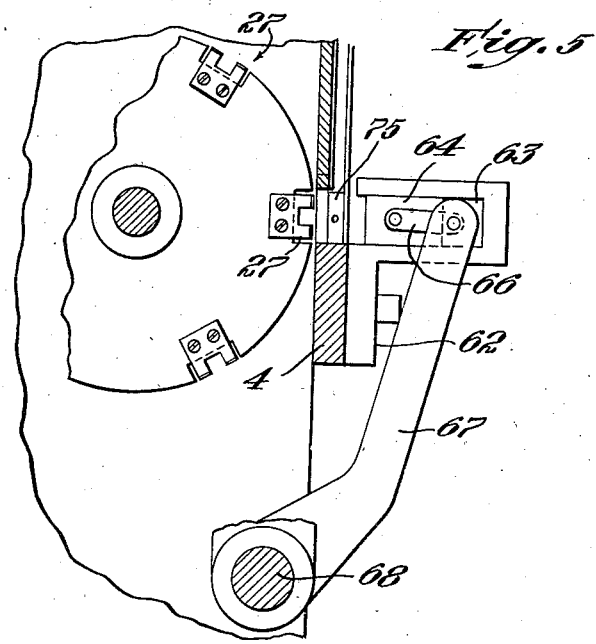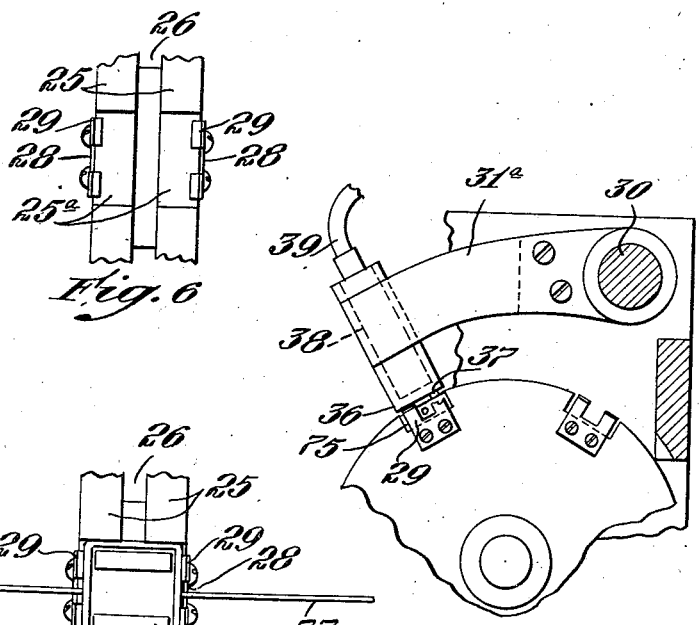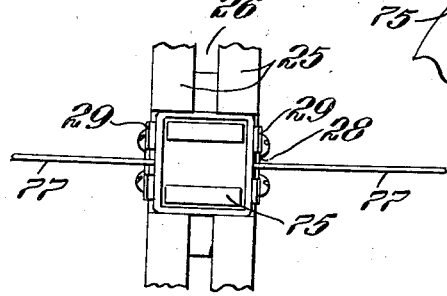

Patented Oct. 21, 1947

2,429,496

UNITED STATES PATENT OFFICE 2,429,496

ROTARY CONVEYOR FOR CONDENSERS

Erwin L. Sutter, Sharon, Mass., assignor to Tobe Deutschmann Corporation, Canton, Mass., a corporation of Delaware Application July 16, 1943, Serial No. 494,967

7 Claims. (Cl. 198—24)

This invention pertains to marking machines and more especially to a machine for marking the plastic casing of an electrical condenser with indicia showing, for example, its capacity.

Condensers of this type, commonly employed in radio apparatus, customarily consist of a flattened coil (comprising two strips of metal foil spaced apart by a thin dielectric material, for instance paper, each strip of foil being electrically connected to a metal clip from which extends a lead wire) the flattened coil and the clips being embedded in a casing of plastic material, for instance synthetic resin. The resin casing is commonly a thin, substantially square block with the two lead wires projecting from the mid points of opposite edges, respectively, of the block, the broad faces of the block usually having moulded therein indicia showing, for example, the commercial type, the maker's name, etc.

After the casing material has been moulded, the capacity of the condenser is electrically tested and the tested capacity is marked upon the plastic casing.

Heretofore the marking of the condenser casing to show its capacity has been a slow and tedious operation adding substantially to the cost of manufacture, and even when done carefully the markings were not always legible nor properly placed.

The principal object of the present invention is to provide an automatic machine for marking condensers with indicia showing their capacity. A further object is to provide a machine operative accurately to impress small articles of moulded thermoplastic resin, for instance electrical condensers, with any desired form of marking or identification. A further object is to provide a machine having provision for marking articles of different sizes either alternatively or simultaneously, as may be desired. Other and further objects and advantages of the invention will be pointed out in the following more detailed description and by reference to the accompanying drawings wherein Fig. 1 is an elevation of the left-hand side of the machine;

Fig. 5 is a fragmentary section on a plane parallel to that of Fig. 3, and to larger scale, showing certain details of the feed mechanism;

Fig. 6 is a fragmentary rear edge elevation of one of the carriers, showing one of the cavities empty;

Fig. 7 is a view similar to Fig. 6, but showing a condenser seated in the carrier cavity;

Fig. 8 is a fragmentary side elevation of one of the carriers showing a heated marking device in operative engagement with a condenser in the cavity;

Figure 1:
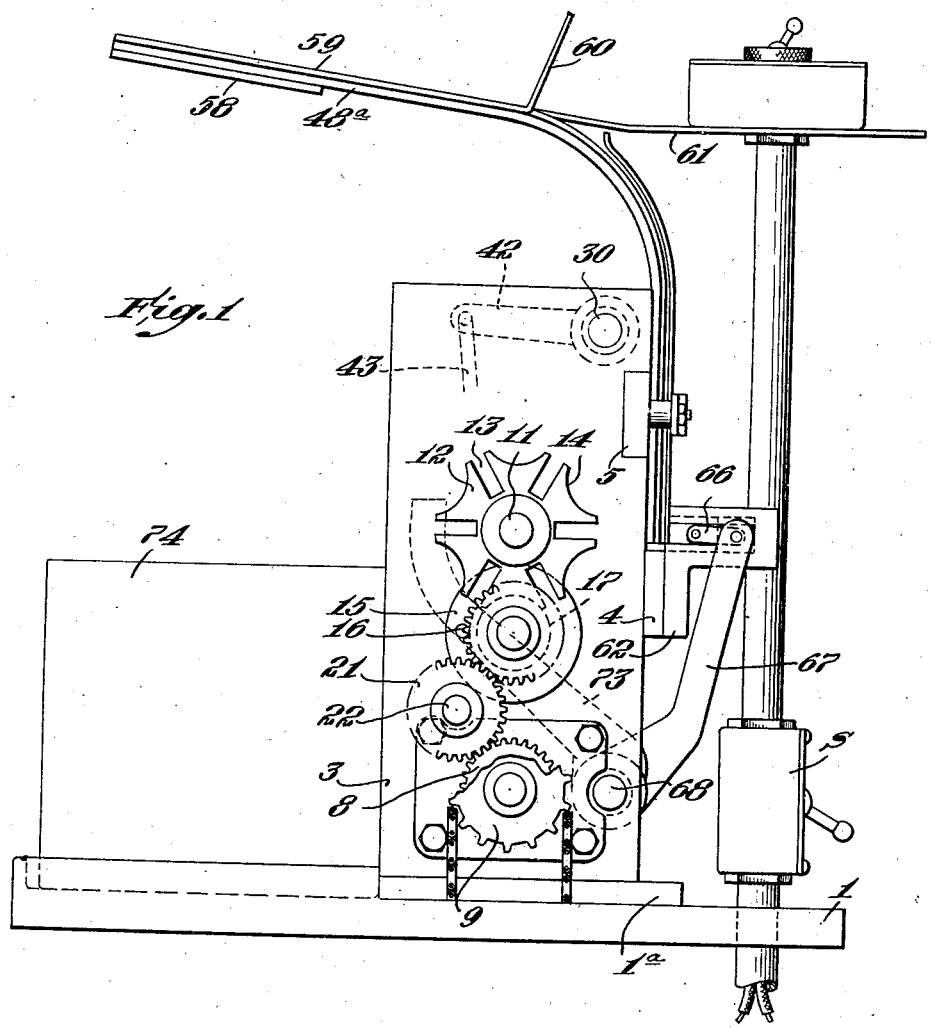

Referring to the drawings, the numeral 1 designates the base of the machine, which may be a casting, or a heavy plate of sheet metal as preferred, and which is designed to rest upon a suitable support, for example a bench. On this base 1 is mounted the horizontally disposed auxiliary base member 1ᵃ of heavy sheet material to whose opposite edges are secured the lower end portions of a pair of vertical, parallel frame members 2 and 3. These vertical frame members 2 and 3 are united at the front of the machine by transverse rails 4 and 5 (Fig. 3), the latter preferably being set flush into recesses in the forward edges of the members 2 and 3.

Figure 2:
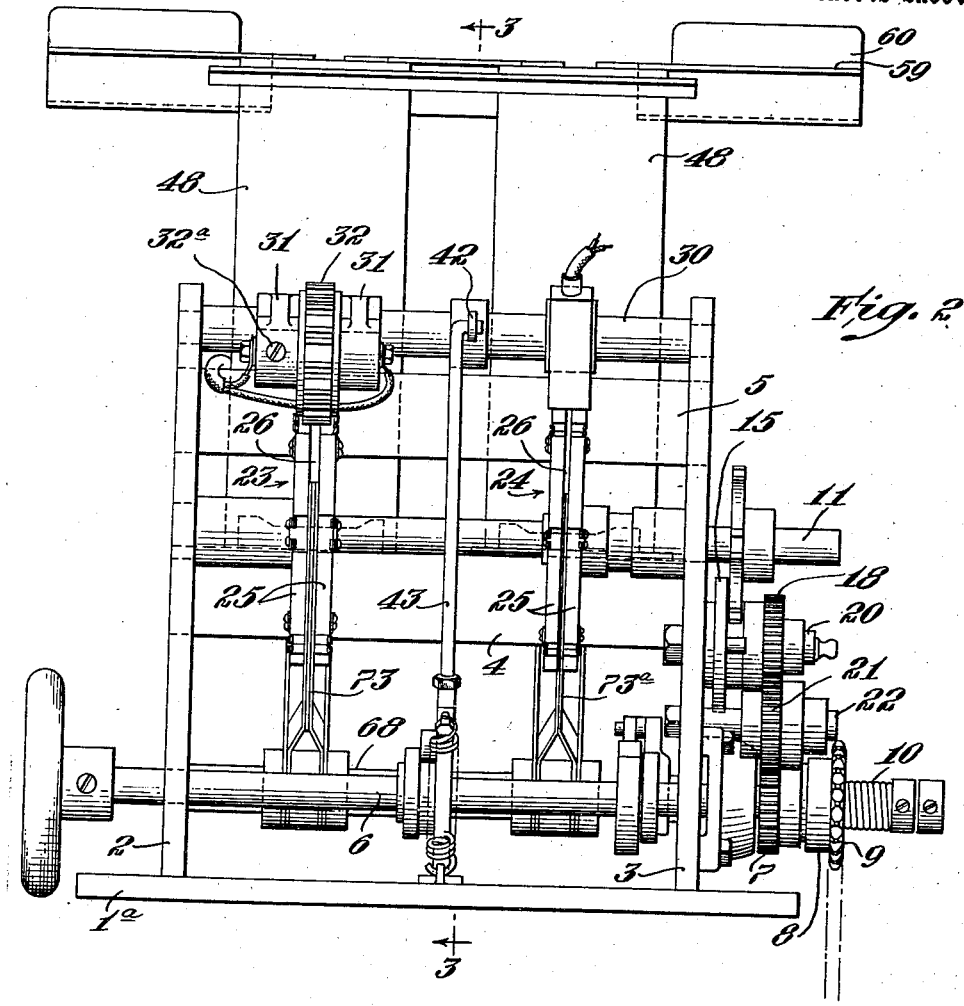
Fig. 2 is a rear elevation of the machine.

The members 2 and 3 are provided with bearings for the main drive shaft 6 which is spaced a short distance above the base member 1ᵃ and which is provided at its right-hand end, as seen in Fig. 2, with a pinion 7 having a hub portion forming part of a friction clutch, the other element 8 of which is loose on the shaft and secured to a sprocket wheel 9 which receives a sprocket chain which embraces a second sprocket wheel (not shown) driven by an electric motor which is controlled by a switch S (Fig. 1). A spring 10 bears against the clutch member 8, tending to hold the latter in frictional engagement with the complemental clutch element carried by pinion 7, thereby to turn the pinion 7 when the motor is in operation, although permitting slippage of the pinion 7 in the event that any obstruction should interfere with the normal operation of the machine.

Parallel with the shaft 6 and above the latter is arranged a shaft 11, also turning in bearings in the members 2 and 3, and having fixed to it at a point to the right of the member 3 (Fig. 2) the star wheel 12 (Fig. 1) of a Geneva drive mechanism, such star wheel having the radial slots 13 and the intervening arcuate surfaces 14. As illustrated, this star wheel has six slots and six of the stop surfaces 14. This star wheel co-operates with a disk 15 carrying a projecting pin 16 which at times engages the slots 13 of the star wheel so as to impart rotation to the latter, and is also provided with a circular boss 17 designed to engage one or another of the surfaces 14 of the star wheel so as to hold the latter stationary at intervals. A pinion 18 (Fig. 2) is fixed to the disk 15, the disk and pinion being mounted to turn on a stub shaft 20 carried by the frame member 3. The pinion 18 meshes with an idler pinion 21 turning on a stub shaft 22 carried by the frame member 3, the pinion 21 engaging the pinion 7 on the drive shaft. As illustrated, the pinions 7 and 8 are of the same diameter and thus the disk 15 turns once for each revolution of the pinion 7. Each complete rotation of the disk 15 turns the star wheel 12 through one-sixth of a revolution.

Mounted on the shaft 11 is a plurality of circular article carriers, two such carriers 23 and 24 (Fig. 2) being shown. While two such carriers are illustrated, it is contemplated that a single such carrier may be used or a greater number than two provided, if desired. Each of these carriers comprises a pair of disks 25 (Figs. 2 and 6) of the same diameter, the disks being fixed to the shaft 11 and being spaced apart as indicated at 26. The carriers 23 and 24, if more than one is used, may be identical in shape and dimensions or they may be of different dimensions respectively to accommodate condensers of different sizes. As illustrated, the carrier 23 is designed to support condensers of larger dimensions than the carrier 24.

Figure 3:
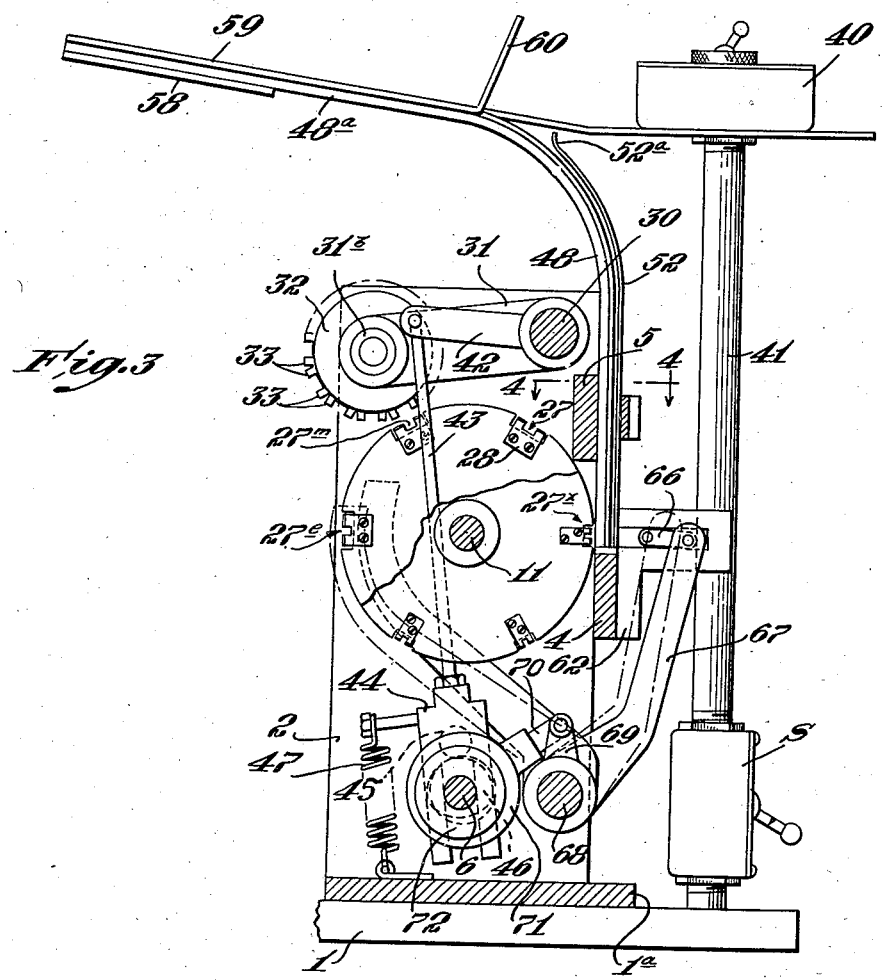
Fig. 3 is a fragmentary vertical section on the line 3—3 of Fig. 2.

Each disk 25 of the carrier is provided in its peripheral portion with a plurality of circumferentially spaced recesses 25a. The recesses 25a of the two disks (which collectively constitute one of the carriers) are arranged in registry, each pair of registering recesses thus cooperating to constitute a cavity for the reception of an article to be marked, such cavities being uniformly spaced about the periphery of the article carrier—six such cavities being herein illustrated. Some of the cavities are designated by the characters 27, 27m, 27e, 27x, (Fig. 3). To the outer radial face of each of the disks 25 there is attached a spring clip 28 adjacent to each of the cavities 25a, such spring clips having spaced friction pads 29 which normally project slightly into the recesses 25a, the notch between the pads being for the accommodation of the projecting lead wires of the condenser. The spring clips thus constitute resilient side walls for the opposite sides of each article cavity and the pads are designed frictionally to engage a condenser when disposed within the cavity, and thus frictionally to retain the condenser in the cavity during the rotation of the carrier.

A shaft 30 (Figs. 2, 3 and 8) is mounted to turn in bearings in the upper parts of the frame members 2 and 3, and this shaft carries arms 31 and 31a, in the places of rotation of the respective carriers. The arm 31 is shown in Fig. 2 as a double or duplex arm having bearings at the outer ends of its constituent parts for a hollow shaft 31b to which is fixed a rotary marking wheel 32 having mounted on its periphery a series of markers 33. The several markers of the series are designed to stamp or impress different characters respectively in the article to be marked and the wheel 32 is designed to be turned at will to bring any selected one of the carriers 23, 24 into the operative marking position. Any suitable clamping means, for example a set screw 32a, may be employed for holding the marking wheel shaft 31b in the selected position of adjustment. Within the hollow shaft 31b is arranged a heating unit having flexible conductors leading to the switch 40.

The arm 31a (Fig. 8) which is associated with the carrier 24, is provided at its free end with a casing 36 which supports a single marking element 37 and which houses a heating unit 38 which receives current through a flexible conductor 39 leading to the aforesaid switch 40, the latter being mounted on a column 41 (Fig. 1) carried by the base 1 and which also constitutes a convenient support for the motor switch S. The heating units heat the marking devices sufficiently so that they will impress the desired character or indication into a condenser casing of thermoplastic material.

The shaft 30 is provided with a rigid arm 42 to which the upper end of a link 43 is pivotally secured. This link is rigidly secured at its lower end to a vertically movable slotted yoke 44 (Fig. 3) which straddles the drive shaft 6 and which is provided with a cam follower roll 45 (Fig. 3) which engages a cam 46 fixed to the shaft 6. Thus at each rotation of the shaft 6 the arm 42 is rocked and the marking devices are moved toward and from the peripheries of the respective carriers. A spring 47 keeps the cam follower roll 45 always in contact with the cam 46.

Figure 4:
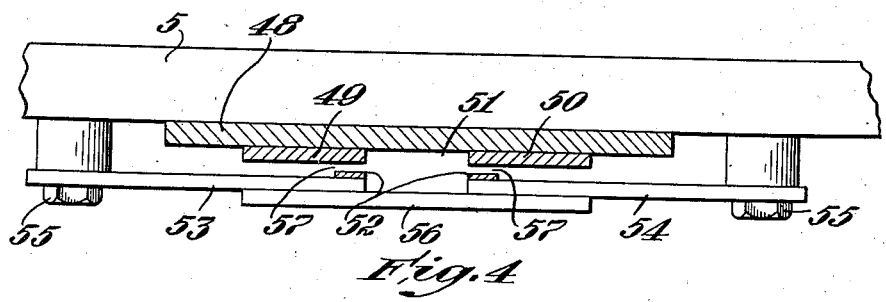
Fig. 4 is a horizontal section, to much larger scale, on the line 4—4 of Fig. 3.

A plate 48 (Figs. 3 and 4) constituting the rear wall of a magazine, is secured to the transverse frame rail 5 and extends upwardly beyond the upper ends of the frame members 2 and 3, and then curves rearwardly and merges with a forwardly and downwardly inclined portion 48a. As illustrated in Fig. 2, there are two of these magazine plates 48, one corresponding to each of the carriers 23 and 24, respectively. To the forward surface of each plate 48 there are secured parallel guide members 49 and 50 (Fig. 4), respectively, their adjacent edges being spaced apart a distance substantially corresponding to the width of the condenser which is to be accommodated in the respective magazine, such edges of the plates 49 and 50 defining the rear portions of magazine channels 51. Spaced forwardly of the members 49 and 50 are guides 52 which are rigidly secured to supporting members 53 and 54 mounted on posts 55 projecting forwardly from the rail 5— the inner ends of the members 53 and 54 being rigidly united by a crossbar 56 which forms the forward wall of the magazine channel 51. The spacing of the guides 52 from the guides 49 and 50 provides lateral extensions 57 of the channel 51 for the reception of the projecting lead wires of the condenser. The guide members 52 extend upwardly and terminate in somewhat resilient end portions, bent forwardly at 52a (Fig. 3) so as to provide flaring entrances for the guide channels 51. The rear end portions of the two plates 48 are united by a transverse member 58 (Fig. 3) and to the opposite end portions of this plate 58 are secured forwardly and downwardly inclined table members 59 terminating at their forward ends in stop members 60, such table members constituting convenient supports for a supply of the articles to be marked.

Secured to the transverse frame rail 4 at points immediately beneath the lower ends of the respective magazine plates 48 are brackets 62 (Figs. 1 and 5) each bracket having a horizontal guide slot 63 whose lower wall is flush with the upper edge of the rail 4. In each of these guide slots 63 there is arranged a sliding pusher block or feed member 64 connected by a link 66 to the upper end of a lever 67 whose lower end is fixed to a rock shaft 68 substantially parallel with the shaft 6 and turning in bearings in the frame members 2 and 3. Also fixed to the shaft 68 is an arm 69 (Fig. 3) pivotally connected to an eccentric rod 70 secured to an eccentric strap 71 mounted on an eccentric 72 carried by the drive shaft 6. The shaft 68 also carries a pair of ejector arms 73 and 73ª respectively, whose upper free end portions are curved and disposed in the spaces 26 between the constituent disks 25 of the two carriers 23 and 24, respectively.

Figure 9:
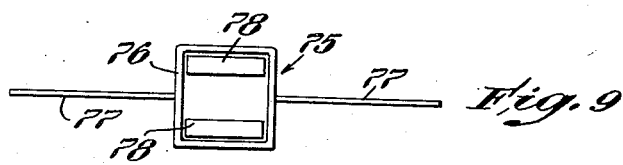
Fig. 9 is a plan view of a condenser such as may be marked in the machine of the present invention.
Figure 10:
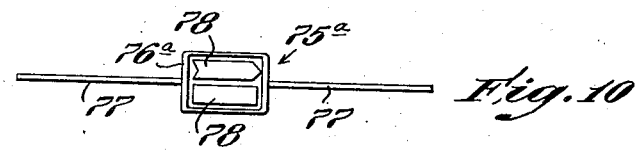
Fig. 10 is a plan view of a condenser of slightly different type and size from that shown in Fig. 6.

In Fig. 9 there is illustrated, by way of example, an electrical condenser 75 such as may be marked by the use of this apparatus. This condenser comprises a substantially rectangular casing 76 of thermoplastic material having the conductor wires 77 projecting from its opposite narrow edges and having flat surfaces 78 at its wider faces for the reception of indicia. In Fig. 10 a smaller condenser 75ª is shown, having the rectangular but elongate casing 76ª and having the flat surfaces 78 for the reception of indicia.

The actuating mechanism of the machine is so designed that while the Geneva motion is holding the shaft 11 stationary in the interval between successive part-rotations, one of the cavities 27ˣ (Fig. 3), for example, is in a horizontal plane directly opposite the path of the pusher or feed block 64, and immediately opposite the lower portion of the magazine channel 51. At the same time another of the cavities 27ᵐ is directly in the path of movement of one of the markers 33, while another of the cavities 27ᵉ is disposed in the ejecting position—for example so that an article ejected from such cavity will drop into a suitable container 74 (Fig. 1) mounted on the rear of the base 1.

The operator places a supply of the articles to be marked, for example the condensers 75 and 75ª, on the table member 59 and then slips them one by one into the upper portions of the magazine channel 51, so that the casings of the condensers are disposed in the channel and the projecting conductor wires 77 lie in the spaces 57 (Fig. 8) between the members 49 and 50 and the guide members 52, respectively. The operator may completely fill the magazine channels if desired before starting the machine. Assuming that the parts are in the position shown in Fig. 3, with the Geneva motion holding shaft 11 stationary, the rotation of shaft 6 rocks arm 42 downwardly thus impressing any condenser which at that time may be in the cavity 27ᵐ with the indicia carried by the heated marking device 33 which at that time is directly above the cavity 27ᵐ. At the same time the block 64 moves inwardly transversely across the magazine channel and thrusts the lowermost condenser into the cavity 27ˣ of the carrier and between the spring pads 29, which frictionally retain the condenser in place. During the same period the ejector arms 73 and 73ª are rocked to the left (Fig. 3) from the dotted line position to the dot and dash position, thus pushing out any marked article which at that time is within the cavities 27ᵉ.

As the shaft 6 continues to rotate, the arm 42 is rocked upwardly, moving the marking devices away from the carriers, at the same time moving the blocks 64 outwardly and permitting new condensers to move downwardly along the magazine channels into the path of the block 64. At the same time the ejector arms 73 and 73ª are returned to their inner dotted position (Fig. 3).

The pin 16 of the Geneva motion now engages one of the slots 13 and imparts a one-sixth turn to the carrier, thus bringing another condenser into the path of the marking device and bringing an empty cavity into position to receive a condenser from the magazine. As soon as the pin 16 has imparted such partial turn to the shaft 11 the latter is locked in position by the engagement of one of the surfaces 14 with the boss 17 and thereupon the shaft 6, by means of the cam and eccentric devices, repeats the marking, feeding and ejecting cycle as above described.

While one desirable embodiment of the invention has been illustrated by way of example, it is to be understood that the invention is not necessarily limited to the precise arrangements shown, but is to be regarded as broadly inclusive of any equivalent constructions and modifications falling within the scope of the appended claims.

I claim:

1. A machine of the type wherein articles are carried by a rotating circular support having on its periphery article holders, said support being intermittently actuated, characterized in that said support comprises a pair of relatively fixed and axially spaced disks the edges of which disks are shaped to provide a plurality of axially substantially aligned spaced recesses and to which disks are fastened holding means extending over the open sides of said recesses thereby forming cavities adapted positively to retain articles inserted therein, with one face of the article freely exposed on the peripheral outside of the cavities.

2. Machine according to claim 1, further characterized in that said holding means are resilient plates each having a recess shaped and arranged to accommodate a projection on said article.

3. A machine of the type wherein articles are carried by a rotating circular support having on its periphery article holders, said support being intermittently actuated, characterized in that said support comprises a pair of relatively fixed axially spaced disks the edges of which disks are shaped to provide a plurality of axially substantially aligned spaced recesses and to which disks are fastened holding means extending over the open sides of said recesses thereby forming cavities adapted positively to retain articles inserted therein with one face of the article freely exposed on the peripheral outside of a cavity, and further characterized in that intermittently actuated ejector means are provided, which ejector means comprises an arm arranged for substantially radial movement between said disks, and means for moving said arm outwardly upon standstill of said disks in the course of said intermittent movement.

4. A machine of the type wherein articles are carried by a rotating circular support having on its periphery article holders, means for feeding articles to said support, said feeding means and rotating support being intermittently actuated in timed relation, characterized in that said support comprises disk means with peripheral cavities having a pair of side walls with a lateral recess shaped and arranged to accommodate a projection of an article, and in that said feeding means comprises channel means for said article having a slot for said projection and means for stopping an article with its projection opposite said recess and ready to be received therein.

5. Machine according to claim 4, further characterized in that said cavities have resilient side walls each having a recess for accommodating oppositely extending projections of said article.

6. Machine according to claim 4, further characterized in that each of said walls has a recess and said channel means has two opposite slots for accommodating laterally extending projections of said article.

7. Machine according to claim 4, further characterized in that said channel means has an opening which leads towards said disk member, and further characterized by a pusher member arranged at said opening, said pusher member being intermittently actuated in timed relation with said feeding means and rotating disk for inserting articles respectively into said cavities, with said projection entering said recess of said side wall.

ERWIN L. SUTTER.

REFERENCES CITED

The following references are of record in the file of this patent:

UNITED STATES PATENTS

| Number | Name | Date |
| --- | --- | --- |
| 719,410 | Hicks | Jan. 27, 1903 |
| 986,548 | Cowles et al. | Mar. 4, 1911 |
| 1,178,246 | Linker | Apr. 4, 1916 |
| 1,202,194 | Lang | Oct. 24, 1916 |
| 1,843,377 | Wickwire | Feb. 2, 1932 |
| 1,952,006 | Wloka | Mar. 20, 1934 |
| 2,066,414 | Milmoe | Jan. 5, 1937 |
| 2,189,637 | Litchfield | Feb. 6, 1940 |

FOREIGN PATENTS

| Number | Country | Date |
| --- | --- | --- |
| 539,773 | Germany | Dec. 7, 1931 |